Figure 1:
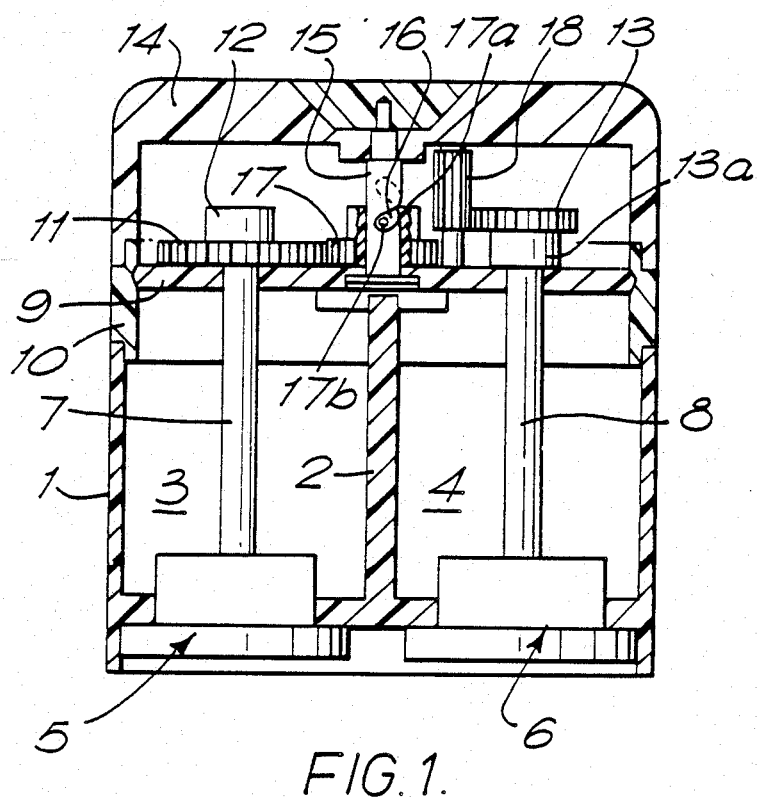

United States Patent [19]

Griffin

[11] Patent Number: 4,844,352
[45] Date of Patent: Jul. 4, 1989

[54] CONDIMENT GRINDERS

[75] Inventor: Anthony H. Griffin, Farnborough, England

[73] Assignee: Cole & Manson, Limited, Farnborough, England

[21] Appl. No.: 94,789
[22] PCT Filed: Nov. 21, 1986
[86] PCT No.: PCT/GB86/00714
 § 371 Date: Jul. 24, 1987
 § 102(e) Date: Jul. 24, 1987
[87] PCT Pub. No.: WO87/03187
 PCT Pub. Date: Jun. 4, 1987

[30] Foreign Application Priority Data

Nov. 25, 1985 [GB] United Kingdom ................. 8528988

[51] Int. Cl.4 .......................................... A47J 42/04
[52] U.S. Cl. .............................. 241/101.2; 241/169.1
[58] Field of Search ........................ 222/142.1–142.9;
  241/285 R, 168, 169, 169.1, 169.2, 101.2, 247, 246

[56] References Cited

U.S. PATENT DOCUMENTS

| | | | |
|---|---|---|---|
| 1,251,160 | 12/1917 | Woody | 241/169.1 X |
| 1,465,505 | 8/1923 | Zoergiebel . | |
| 2,060,807 | 11/1936 | Johnston . | |
| 3,827,641 | 8/1974 | Andersson . | |
| 4,709,865 | 12/1987 | Bounds | 241/146 X |
| 4,771,955 | 9/1988 | Paulson | 241/169.1 |

FOREIGN PATENT DOCUMENTS

| | | |
|---|---|---|
| 2646935 | 8/1978 | Fed. Rep. of Germany . |
| 2852398 | 6/1979 | Fed. Rep. of Germany ... 241/169.1 |
| 3142348 | 5/1983 | Fed. Rep. of Germany . |
| 3430196 | 12/1985 | Fed. Rep. of Germany . |
| 749911 | 8/1933 | France . |
| 2112621 | 6/1972 | France . |

Primary Examiner—Mark Rosenbaum
Attorney, Agent, or Firm—Lowe, Price, LeBlanc, Becker & Shur

[57] ABSTRACT

A condiment grinder comprises a cylindrical container preferably transparent and which incorporates a diametric partition serving to divide the container into a compartment for containing one condiment such as salt and a compartment for containing a second condiment such as peppercorns. Each compartment has associated therewith and located in the vase a pair of coaxial and relatively rotatable grinding tools, respectively. A tool set may be engaged for rotation by turning a top in one direction or the other, drive being applied to a gear or a gear from a center shaft by an idler gear movable up or down a helical groove on a drive shaft according to the rotation direction of the top.

7 Claims, 5 Drawing Sheets

CONDIMENT GRINDERS

This invention relates to condiment grinders of the kind having a container to hold the condiment to be ground, which may be peppercorns or crystalline salt, with a pair of co-operating coaxial grinding tools at the base of the container with one tool relatively rotatable with respect to the other. In use, the central tool is coupled to a shaft which is arranged to be manually rotated with the condiment to be ground being fed from the container to between the tools which relatively rotate to cause a crushing and grinding action.

With such condiment grinders two discrete units will be required to form the normal complement for a table, and although it has been proposed to combine, for example, a pepper grinder and a salt grinder on a common stand or otherwise integrated, nevertheless each has hitherto been mechanically a separate unit and one or other has to be selectively operated depending on whether salt or pepper is required to be dispensed.

According to this invention there is provided a condiment grinding set comprising two adjacently positioned containers each for holding a different condiment and each associated with a set of grinding tools, each grinding tool set being operatively connected through a drive means with a manually operable member incorporating a selector device whereby the manually operable member may be caused to operate one or other of the sets of grinding tools.

In this invention a condiment grinder is thus provided which may contain two condiments with a manually operable means which can be activated to selectively dispense one or other of the condiments. The possibility of selecting both condiments simultaneously is not excluded.

Preferably, a single rotatable knob, handle or the like manually operable member is provided coupled with the grinding tools via a drive, such as a gear drive, incorporating a selector device which couples the drive to one or other of the grinding tool sets. The selector device may comprise a separate hand operable member to cause operation of one or other of the sets of grinding tools or, advantageously, the drive means is arranged so that rotation of the hand operable member in one direction causes drive to be applied to operate one set of grinding tools and rotation in the opposite direction causes the drive to be applied to operate the other set of grinding tools. With such a preferred arrangement a user may selectively dispense one or other of the condiments by rotating the knob or the like in one or other directions.

Preferably, the containers are defined by a casing which incorporates a partition member to separate same into two compartments one for each condiment, with a set of grinding tools and a drive shaft therefor located in each compartment, the drive shafts extending upwardly to a housing provided on the top of the container. The adjacently positioned containers will advantageously be in side by side relationship and constructed as an integral, preferably cylindrical, unit. The housing may incorporate a gear train arranged so that on rotation of a top part of the housing in one direction gear drive is applied to one shaft, whereas rotation in the opposite direction disengages the drive from said one shaft and applies drive to the other shaft. In an embodiment of the invention this selective drive to one or other of the shafts associated with a grinding tool set may be effected through a gear running on a helical shaft whereby the gear moves in one direction along the shaft when the manual member is rotated one way, thus engaging a gear attached to one of the grinding tool shafts, or moves along the helical shaft in the opposite direction when the member is rotated the other way so as to engage the drive on the other shaft.

In an alternative construction a slipping clutch or dog clutch drive is provided which causes rotation of a respective shaft attached to a grinding tool when rotated in one direction only. By such means each shaft may have an associated slipping clutch or one-way drive so that the tools are only rotated when the top part of the housing is turned in a respective direction.

There is also provided a further embodiment wherein a manual lever, knob, button or the like means is provided to change over the drive to apply same to one or other of the shafts.

It will be appreciated that many constructions of mechanical gear means can be provided to achieve the selective engagement of one or other drive shafts with the manually rotatable member, those herein described being purely exemplary. In order to make use of grinding tools already known it will be preferable to arrange for the two shafts to be driven in the same sense, notwithstanding the reverse rotation applied to the knob or the like. To achieve this an intermediate gear may be provided. It is, of course, equally possible to construct one of the grinding tools such that it will have a reverse direction of rotation to the other grinding tool to effect operation. In a further preferred embodiment the gearing between the manually operable member and each respective drive shaft associated with one or other of the grinding tools may have a different ratio thus for any given rate of rotation of the manual member one grinding tool may be driven at a different speed to the other. This can have certain advantages when different condiments are ground or where the grinding tools themselves have different characteristics requiring different rotational speeds for efficient operation.

Figure 2:
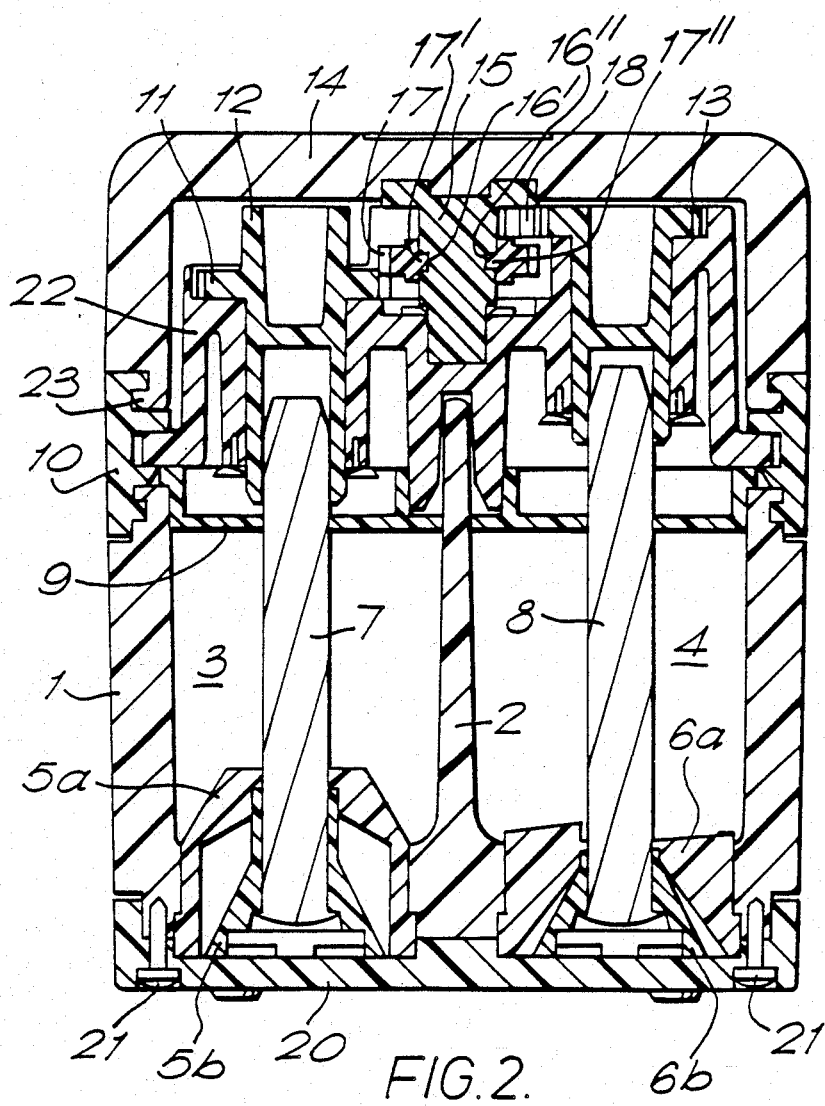
Figure 3:
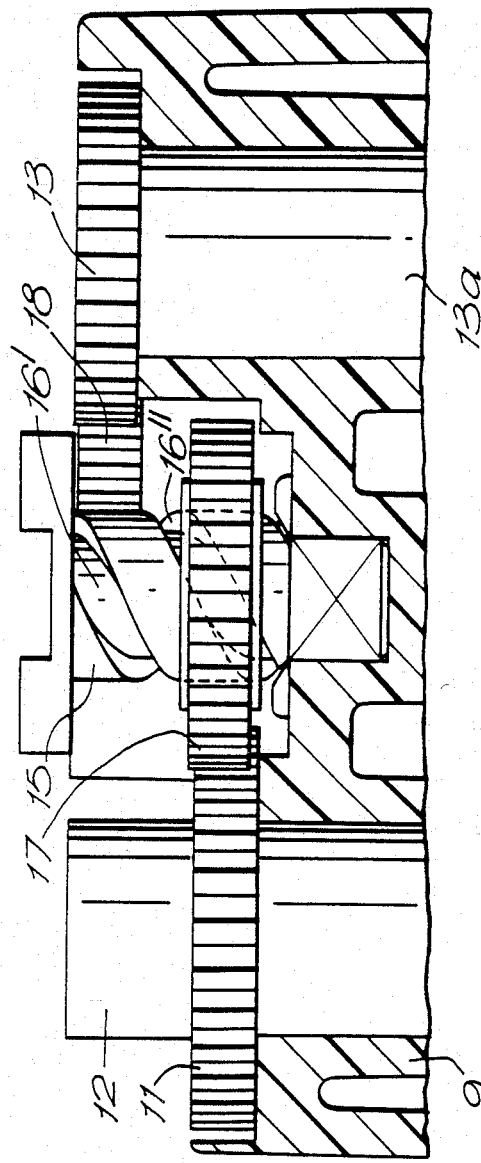
Figure 4:
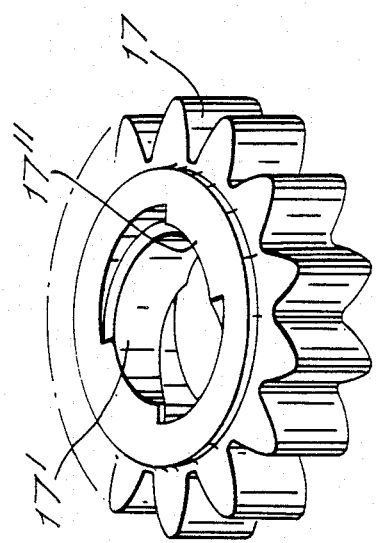
Figure 5:
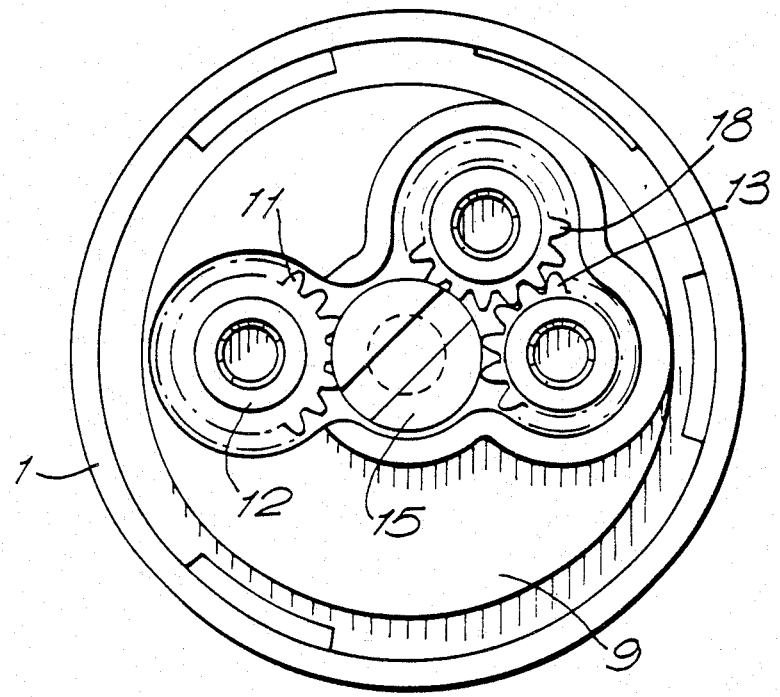
Figure 6:
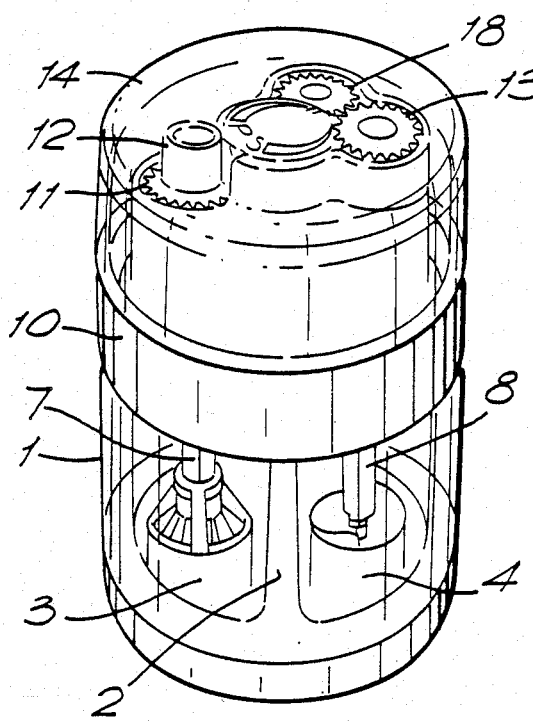
Figure 7:
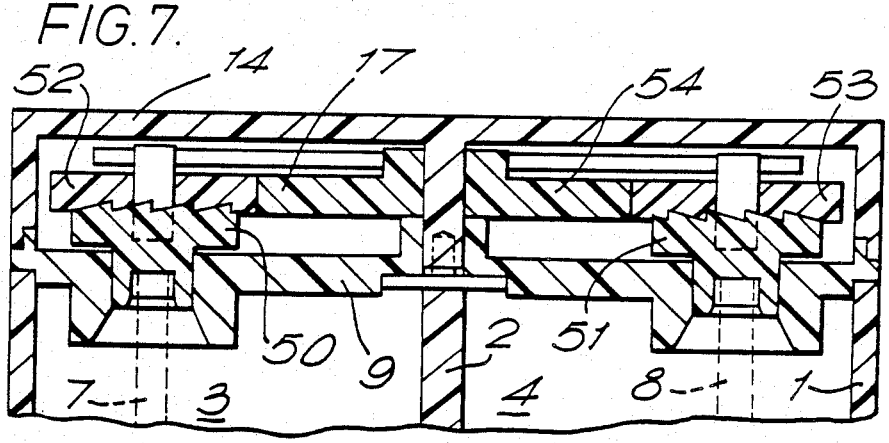

Embodiments constructed according to this invention are shown by way of example only in the accompanying drawings. In the drawings:

FIG. 1 shows a longitudinal section through a first embodiment of condiment grinder, FIG. 2 shows a similar longitudinal section through a second embodiment, FIG. 3 shows a detail of the helical drive gear assembly, FIG. 4 shows a detail of the idler drive gear, FIG. 5 shows a plan view of the drive gear mechanism, FIG. 6 shows a perspective view of the condiment grinder, and FIG. 7 shows in part longitudinal section a further embodiment utilizing a ratchet type drive.

Referring firstly to FIG. 1 of the drawings, a condiment grinder comprises a cylindrical container 1 preferably transparent and which incorporates a diametric partition 2 serving to divide the container into a compartment 3 for containing one condiment such as salt and a compartment 4 for containing a second condiment such as peppercorns. Each compartment 3 or 4 has associated therewith and located in the base a pair of coaxial and relatively rotatable grinding tools 5 and 6 respectively. These tools are not described in detail as they are well known in the art.

The central one of each set of grinding tools 5 and 6 has a shaft 7 and 8 respectively which passes through an upper casing part 9. This casing part 9 may be captive within but relatively rotatable with respect to a ring 10 which has some form of releasable engagement with the top end of the container 1. Thus, by rotating the ring 10 the part 9 and top of the container may be removed so as to fill the compartments 3 and 4. The casing part 8 carries a gear wheel 11 which has a central boss 12 engaging the square top of shaft 7. Similarly, the shaft 8 engaged by a boss 13a of a gear wheel 13 is also carried by the part 9. The shafts 7 and 8 may axially slide within the respective central bosses 12, 13a of the gear wheels 11 and 13, thus enabling the top to be removed complete with the part 9 and gears. A rotatable hand-operable member 14 is located on top of the casing 1 and this is coupled with a central shaft 15 having a helical groove 16. When the member 14 is rotated this causes also rotation of the shaft 15. Located about the shaft 15 is a gear 17 having a central aperture 17a with one or more inwardly directed lugs 17b which engage the helical groove 16. The gear 17 is otherwise free to move longitudinally along shaft 15.

The gear 17 in the position shown, engages the gear 11 of the one condiment tool set 5 and there is also provided an intermediate gear 18 which can be engaged by the gear 17 when the latter is moved upward along the shaft 15. The gear 18 forms an intermediate drive between the gear 17 and the gear 13 associated with the other condiment tool set 6.

The arrangement is such that on rotating the member 14 in one direction the helical groove 16 engages the lugs in gear 17 to force the gear either downwardly to positively engage the gear 11 or when rotated in a reverse direction, upwardly to engage gear 18. Thus according to the direction in which the member 14 is rotated, the gear 17 will be in an operative driving position either in the lower position engaging gear 11 as shown or in an alternative upper position engaging the gear 18.

By this arrangement, rotation of one or other of the condiment grinding tool sets 5 or 6 may be effected by selectively rotating the member 14 in one or other direction, the provision of the intermediate gear 18 ensuring that, regardless of the direction of rotation of the member 14, the grinding tools 5 or 6 will be rotated in the same and correct sense for proper operation.

The condiment grinder shown in FIGS. 2 to 5 has a similar operative construction but the configuration and layout of the gear drive is different, although having the same principle of operation. In FIG. 2 identical reference numerals have been used to indicate parts of a like function and the principal difference here is that the intermediate gear 18 is positioned to one side of a line connecting the centres of gears 11, 17 and 13 and is of a larger diameter than the gear 18 shown in FIG. 1 (see FIG. 5). For this reason the gear is only partly shown in FIGS. 2 and 3 as it lies out of the plane of the sections. The relative gear ratios are: gear 18 is larger than 13: gear 17 is the same as 13: gear 11 has the largest diameter: gears 17 and 13 have a ratio of one to one: and gears 17 11 have a higher ratio. A particular feature of both the constructions shown is that the gears are fully contained within the rotatable member 14 above the parts 9 and thus do not directly come into contact with the condiments to be ground. The plate parts 9 comprise two removable plugs each of which closes a respective compartment 3 or 4. This feature is of importance from a hygiene point of view and, in addition, the materials to be used for the gears can be chosen more for their adaptation to the purpose rather than being necessarily of a food grade material. The whole gear assembly can therefore be housed in a sealed unit which is fully detachable in order to fill the compartments 3 and 4 by virtue of the rotatable ring 10 and the axially sliding engagement between the square tops of the grinding tool shafts 7 and 8 and the respective bosses 12 and 13a of gears 11 and 13.

FIG. 3 is a view showing in more detail the arrangement of the helical shaft 15 which in this arrangement has two diametrically opposed helical grooves 16' and 16" which each engage a respective lug 17' and 17" on the gear 17 shown in FIG. 4.

The embodiment of FIG. 2 shows the grinding tools 5 and 6 in more detail and as can be seen each is constituted by an outer fixed tool 5a and 6a respectively with a conically shaped inner tool 5b and 6b respectively which are coupled to the shafts 7 and 8. In this embodiment the construction of each tool set 5 and 6 is adapted to give the best results with the condiment such as peppercorns or salt granules. The shafts 7 and 8 each preferably has a helical external surface which assists in disturbing the condiments in the containers and causing them to feed to the tools. The grinding tool sets 5 and 6 are secured in the container by means of a base plate 20 which is retained by screws 21 engaging the base of the casing 1. The gear drives 12, 13, 17 and 18 are preferably carried on a moulded plastics assembly 22 which is clamped along with the plate part 9 by the ring 10. The ring 10 holds together by a profiled lip 23 formed in the lower edge of the rotatable member 14 the parts 14, 22 and 1. In FIG. 2 the gear 17 is shown in an intermediate position whereas in FIG. 3 the gear is shown engaged with the gear 11 associated with the grinding tool set 5.

FIG. 7 shows a fragmentary view of an arrangement using a different method of effecting the selective rotation of one or other of the condiment grinding tools wherein the top of each tool shaft 7 and 8 includes a respective gear 50 and 51 having an upper face surface provided with a series of teeth forming with a further toothed gear 52 and 53, a dog clutch drive which is driven from a central drive 54 associated with the top housing 14. The respective dog clutches formed by the gear pairs 50, 52 and 51, 53 will allow rotation in only ond direction and spring loading is applied to maintain the mutually engaging faces in contact such that on reverse direction the dogs will ride over one another without causing any relative rotation of the grinding tools. Although the embodiment here illustrates a mechanism effecting rotation of the grinding tools in mutually different directions, an intermediate gear can, nevertheless, be incorporated as required to achieve rotation in the same direction as in the previous embodiments.

As will be appreciated the gear drive means and clutch devices described are exemplary of a number of different mechanisms that may be employed, the essence of the invention being the provision of a single rotatory member which can be selectively controlled to operate one or other of two associated condiment grinding tool sets whereby dispensing selectively of one or other condiments may be achieved.

I claim:
1. A condiment grinder comprising:
 a casing having a partition to divide said casing into first and second compartments each to hold a re- spective condiment to be ground, each of said first and second compartments having a upper end and a base portion;

first and second sets of cooperating rotatable grinding tools located in respective base portions of said first and second compartment, each of said first and second grinding tools having a shaft extending through the respective compartment;

a support extending across said upper ends of said first and second compartments;

first and second gear drives positioned on said support, each of said first and second grinding tool shafts engageable with said first and second gear drives, respectively;

a rotatable member positioned on the top of the casing and including drive means for selectively engaging said first and second gear drives in response to a direction of rotation of said rotatable member, said shafts of said first and second grinding tools having first and second gear wheels, respectively, engaging said first and second shafts, said first and second gear wheels displaced from each other along a longitudinal direction of said shafts; and a drive gear coupled to said rotatable member and movable in said longitudinal direction of said shafts so as to engage, alternatively, said first or second gear wheel.

2. A condiment grinder in accordance with claim 1 wherein the drive gear is positioned on a stub shaft secured and rotatable with said rotatable member, the drive gear engaging said stub shaft through a helical track, rotation of the rotatable member in one direction causing the drive gear to be moved to one end of the shaft to engage one of said first and second gear wheels and rotation of said rotatable member in the opposite direction causing the drive gear to be moved to the other end of the stub shaft to engage, alternatively, the other of said first and second gear wheels.

3. A condiment grinder according to claim 2, wherein an intermediate drive gear is provided transmitting drive from said first gear to said first shaft.

4. A condiment grinder comprising:

a container divided by a partition into first and second compartments for holding respective condiments to be ground;

first and second condiment grinder tools located in said first and second compartments, respectively, for grinding said respective condiments;

first and second drive shafts for operating said first and second condiment grinder tools, respectively;

first and second gear drive means for operating said first and second drive shafts, respectively, said first and second gear drive means including gears longitudinally displaced from each other along said first and second drive shafts;

a handle rotatably mounted on said container;

a third drive shaft rotatably engaging said handle and having a helical grove; and a drive gear mounted on said third drive shaft and engaging said helical groove thereof, said drive gear movable longitudinally on said third drive shaft so as to engage alternatively (1) said gear of said first gear drive means when said drive shaft is rotated by said handle in one direction and (2) said gear of said second gear drive means when said drive shaft is rotated by said handle in the opposite direction.

5. A condiment grinder comprising:

a container divided by a partition into first and second compartments for holding respective condiments to be ground;

first and second condiment grinder tools located in said first and second compartments, respectively, for grinding said respective condiments;

first and second drive shafts for operating said first and second condiment grinder tools, respectively;

first and second gear drive means for operating, respectively, said first and second drive shafts, said first and second gear drive means including respective first and second clutch mechanisms, said first clutch mechanism coupling to the first drive shaft when the first gear drive means is rotated in one direction, the second clutch means coupling to the second drive shaft when the second gear drive means is rotated in the opposite direction;

a handle; and a drive gear mounted on said container and connected to said handle for controlling, alternatively, said first and second clutch means in response to the direction of rotation of said handle.

6. A condiment grinder according to claim 5, wherein said clutch means of said first and second drive means each comprise a slipping clutch drive.

7. A condiment grinder according to claim 5, wherein said clutch means of said first and second drive means each comprise a dog clutch drive.

* * * * *